Nov. 24, 1970
A. W. RICHMOND
3,543,112
LOCOMOTIVE SPEED CONTROL DEVICE
Filed Jan. 29, 1969
2 Sheets-Sheet 1
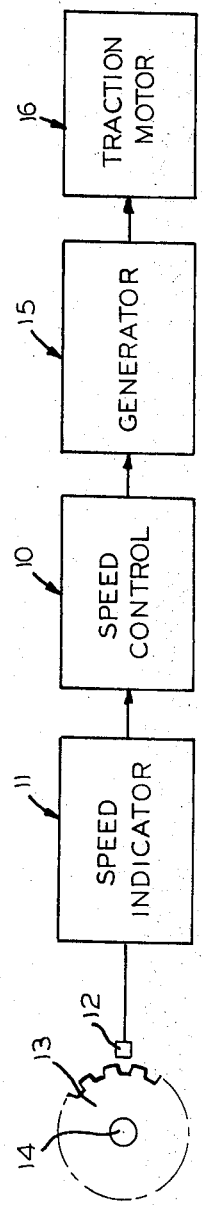
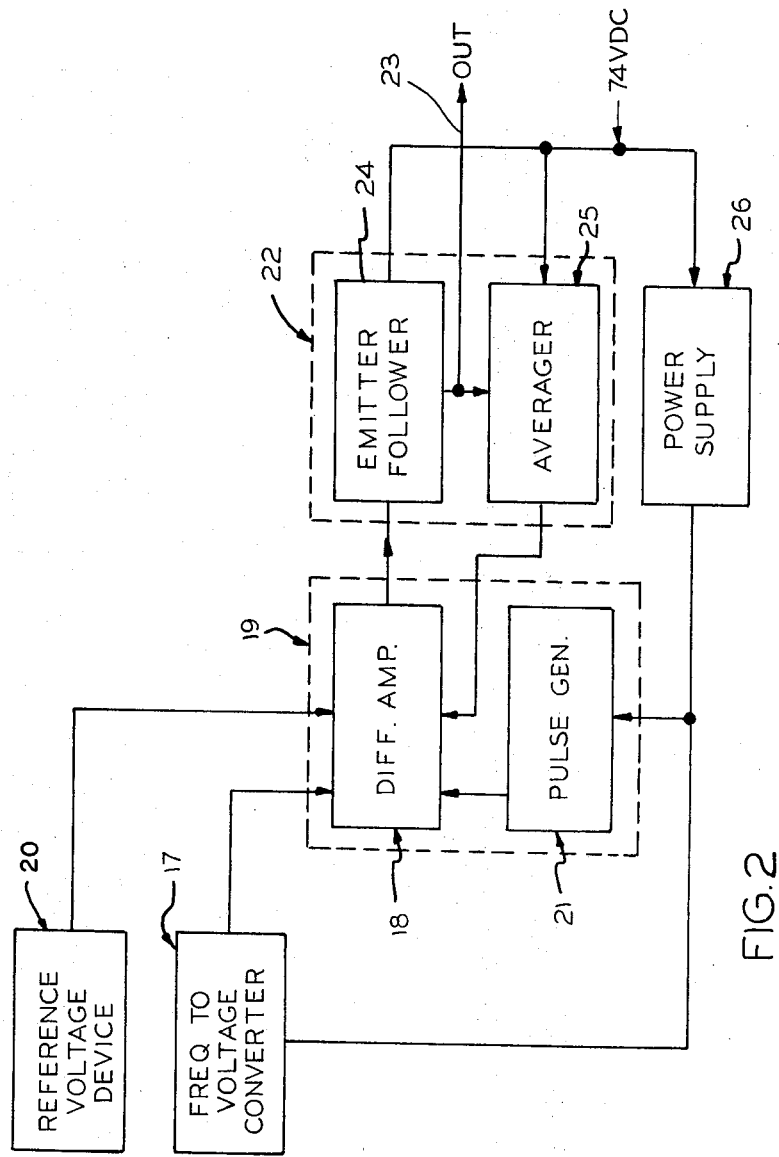
INVENTOR
ABRAHAM W. RICHMOND
BY
ATTORNEY United States Patent Office 3,543,112
Patented Nov. 24, 1970

3,543,112
LOCOMOTIVE SPEED CONTROL DEVICE
Abraham W. Richmond, Hickory Hills, Ill., assignor to Vapor Corporation, Chicago, Ill., a corporation of Delaware
Filed Jan. 29, 1969, Ser. No. 794,899
Filed Jan. 29, 1969, Ser. No. 794,899
Int. Cl. H02p 5/24
U.S. Cl. 318—146                                    12 Claims

ABSTRACT OF THE DISCLOSURE

Speed control device for automatically controlling the low speed of a locomotive in a consist, wherein uniform speed is maintained even though the weight of the consist may increase or decrease, such as during loading or unloading operations, and which device includes electronic circuitry which receives a speed signal from a speed indicator device and compares it with a reference signal of a preselected speed, and thereby controls the operation of the locomotive drive train.

---

This invention relates in general to a speed control device for automatically controlling low speed operation of a train by controlling operation of the locomotive or locomotives, and more particularly to an electronic speed control device for controlling low speed operation of a train.

The present invention results from the advent of unit trains and automatic loading and unloading of bulk commodities requiring a need for steady and accurate speed control at low speeds of operation. In particular, the speed control device of the invention automatically controls the speed of a locomotive or locomotives in a consist at low speeds of operation, such as below one mile per hour. While the present invention will be described and explained in application to a locomotive, it will be appreciated that it might well be applied to control the speed of other vehicles or devices having electrical driving motors. It will be recognized that the present invention is equally applicable for modulating low speed control for humping, weighing in motion, automatic journal box oiling and many other operations associated with trains where precise, low, constant speed is required.

The speed control device of the invention comprises unique electronic circuitry that is capable of maintaining preselected low speeds without fluctuations or overshooting by regulating the output of the locomotive main generator. The generator may be an AC or DC machine, which in turn controls the current to AC or DC traction motors. By providing a precise, uniform control of speed, evenly balanced loading and unloading may be accomplished with no spillage, while reducing bearing wear, coupler strain and uneven stress on cars. During humping operations, time is saved by controlling the locomotives with a constant, steady speed. Further, the automatic, uniform speed control accomplished by the present invention reduces manpower and equipment time in automatic journal box oiling operations, car weighing in motion operations, starting of large trains, passenger car washing, and work train operations such as unloading ties along the right-of-way, welding rail sections, plowing of snow, testing of rail and spraying of weeds.

It is, therefore, an object of the present invention to provide an automatic low speed control for locomotives which is capable of operating a locomotive at precise, low and constant speed even though the weight of the consist of the locomotive may be increasing or decreasing.

Another object of this invention is in the provision of a locomotive speed control device for trains capable of automatically modulating train speed at low levels preselected by the locomotive operator, wherein the speed control device is especially suitable to facilitate automatic loading and unloading of bulk commodities.

A still further object of this invention resides in the provision of an automatic speed control device for locomotives that is also capable of effecting plugging.

Other objects, features and advantages of the invention will be apparent from the following detailed disclosure, taken in conjunction with the accompanying sheets of drawings, wherein like reference numerals refer to like parts, in which:

FIG. 1 is a partially diagrammatic and partially block diagram illustrating the use of the present invention in controlling the speed of a locomotive;

FIG. 2 is a block diagram of the speed control device according to the present invention.

Figure 3:
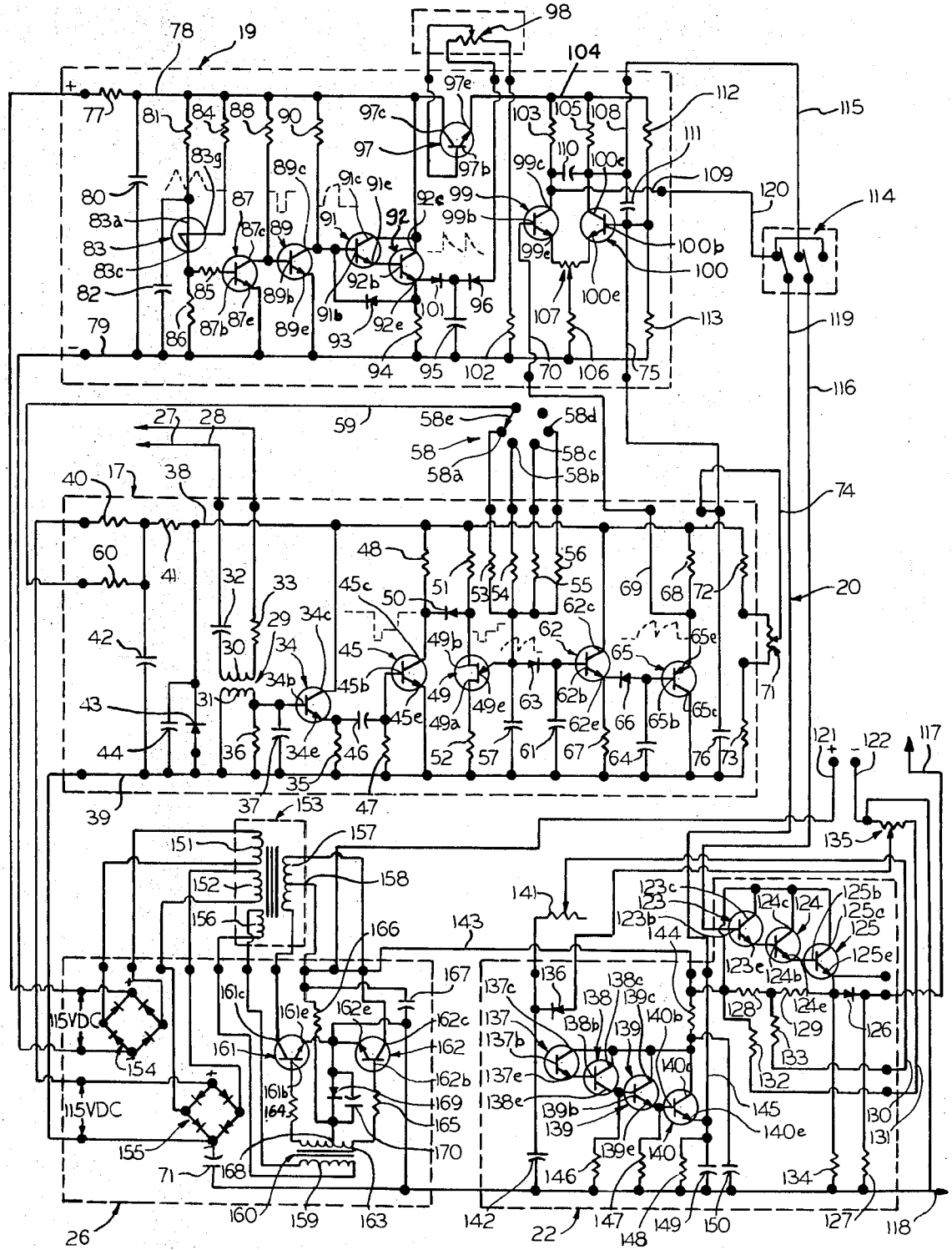
FIG. 3 is an electrical, schematic diagram of the speed control device according to the present invention.

Referring now to FIG. 1, the speed control device of the invention is generally indicated by the numeral 10 and illustrated in association with other components provided in a locomotive drive train. A speed signal is generated by a speed indicator 11 and delivered to the speed control device. While the speed indicator 11 may take any desirable form, it is preferably of the type disclosed in my co-pending application Ser. No. 709,058, filed Feb. 28, 1968, wherein a magnetic sensor 12 is arranged in spaced relation to a gear 13 on an axle 14 of a locomotive to generate pulses upon the passing of gear teeth. The pulses generated by the magnetic pickup 12 are converted by the speed indicator 11 to a speed signal which is delivered to the speed control device 10 of the invention as a shaped and amplified rectangular pulse waveform, whose repetition rate is proportional to train speed. The output of the speed control device controls the field current of the locomotive generator 15 which in turn drives the traction motors 16 of the locomotive to increase or decrease the speed of the train.

The block diagram of FIG. 2 illustrates generally the operation of the present invention, wherein the pulse waveform from the speed indicator 11 is received by a frequency to voltage converter 17, which converts the pulse frequency to a voltage level and applies same to a differential amplifier 18 of a differential amplifier and pulse generator module 19. A reference voltage level generated by the reference voltage device 20 merely constitutes a speed control dial that is adjusted by the locomotive engineer to a preselected speed. Thus, the pulse frequency representing a train speed is converted into a voltage level by the frequency to voltage converter for comparison with a reference voltage representing a preselected speed that is delivered from the reference voltage device 20.

A pulsating supply voltage is provided by the pulse generator 21 and supplied to the differential amplifier. This pulsating supply of voltage is produced in place of the conventional steady state DC supply voltage to prevent the train from overshooting the speed for which it was set. In the usual application of power to a train sitting at rest, power in the excess of the amount needed for a desired speed must be applied to "break" the wheels free of the track. This excess power might result in the wheels slipping on the track until the train begins to move. Once the train is in motion, the power applied originally will result in a speed greater than required and the throttle must be retarded to compensate for the reduced track friction. The present invention, because of the pulse generator, imparts spurts of power to the wheels, thereby resulting in a smooth, non-slipping start with the gradual buildup of speed and minimum overshoot as the system builds up to the preselected speed setting.

The output of the differential amplifier is applied to an averager and emitter-follower module 22, from which it is routed to the generator field along output line 23 to control locomotive speed. The averager and emitter-follower module 22 include an emitter-follower 24 and an averager 25, wherein the emitter-follower 24 receives the output from the differential amplifier, and a portion of the output from the emitter-follower is fed to the averager and delivered back into the differential amplifier in the form of a gradually changing DC level.

The averager and emitter-follower are supplied with the train voltage (74 v. DC). Similarly, a power supply 26 is supplied with the train voltage to produce a desired supply voltage for the frequency to voltage converter 17 and the pulse generator 21.

As a difference, voltage is supplied by the differential amplifier to the averager and emitter-follower, and then routed to the generator field to control the locomotive speed, the speed will be varied automatically to bring the differential amplifier into balance. In the general operation of the speed control device according to the invention, the engineer then moves the throttle into the required notch, releases the brake, switches on the speed control device, and operates the reference voltage device 20 to the desired speed setting. The operation of the locomotive is thereafter automatic, not requiring the adjusting of any control levers or watching and measuring the speed of the locomotive in any manner. Straight-forward automatic, low-speed control is thereafter maintained by the speed control device of the invention even though the weight of the consist may increase or decrease.

FREQUENCY TO VOLTAGE CONVERTER

The function of the frequency to voltage converter 17 as already indicated, is to convert the pulse frequency representing train speed and being generated by the speed indicator 11 into a voltage level. The higher the incoming frequency, the lower the output voltage generated. With particular reference to FIG. 3, the speed signal is introduced into the frequency to voltage converter along the input lines 27 and 28. The input lines carrying the speed signal are coupled to the frequency to voltage converter by a transformer 29 having primary and secondary windings 30 and 31. The input line 27 is connected to one side of the primary winding 30 through a condenser 32, while the input line 28 is connected to the other side of the primary winding through a resistor 33.

The speed signal pulses entering the frequency to voltage converter are applied to the emitter-follower transistor 34 through the transformer 29. One side of the secondary winding 31 is connected to the base 34b of the transistor 34, while the other side of the secondary winding is connected to the emitter 34e through a resistor 35. A resistor 36 and a condenser 37 are connected in parallel and across the transformer secondary winding 31. A 115 v. DC supply generated by the power supply 26 drives the frequency to voltage converter, and is fed in through the positive input line 38 and the negative input line 39. Voltage reduction is accomplished by resistors 40 and 41. A condenser 42 is connected between the resistors 40 and 41 and to the negative line 39. Voltage regulation is accomplished by the Zener diode 43 connected across the positive and negative lines. Condenser 44 is connected across the Zener diode 43. The collector 34c and emitter 34e of the emitter-follower transistor 34 are connected across the positive and negative lines 38 and 39. As is evident, one side of the secondary winding 31, together with one side of resistors 35 and 36 and the capacitor 37 are also connected to the negative line 39.

The positive output pulses of the emitter-follower transistor 34 are inverted and amplified by the amplifying transistor 45. The base 45b is connected to the emitter 34e of the emitter-follower 34 through a coupling condenser 46. A resistor 47 is connected in common to one side of the condenser 46 and the base 45b of the amplifying transistor 45, and to the negative line 39. A resistor 48 connects the collector 45c to the positive line 38, while the emitter 45e is connected in common to the negative line and one side of the resistor 47.

The collector 45c of the amplifying transistor 45 is coupled to the base two 49b of the unijunction transistor 49 through a diode 50. The negative-going pulse coupled to base two 49b will lower the firing point of unijunction transistor 49 causing it to fire sooner than normally. A resistor 51 is connected in common to base two 49b and the diode 50, and to the positive line 38, while the base one 49a is connected to the negative line 39 and the emitter 45e of the amplifying transistor 45 through a resistor 52.

The output of the unijunction transistor 49 through the emitter 49e is connected to one side of a series of speed range selecting resistors 53, 54, 55 and 56 and to a condenser 57 that is connected in common to the negative line 39 and the resistor 52. The speed range selecting resistors 53, 54, 55 and 56 are coupled to contacts 58a, 58b, 58c and 58d of a speed range selector switch 58. A switch arm 58e provides selection of the contacts and range transistors, and is connected by conductor 59 to a common point between resistors 40, 41, and 42 through a resistor 60. The speed range of the speed control device is set by the engineer by manipulation of the speed range selector switch 58, and the resistors 53, 54, 55 and 56 are selected from the lowest to the highest speed control range. The firing voltage of the unijunction transistor 49 is a saw-tooth form generated by the charge of condenser 57 through one of the resistors 53, 54, 55 and 56 as selected by the speed range switch 58. This saw-tooth voltage on the emitter 49e of the unijunction transistor is filtered by the condenser 61 and applied to the base 62b of the emitter-follower transistor 62. The emitter 49e is coupled to the base 62b through a diode 63, and the condenser 61 is connected in common to the diode 63 and the base 62b, and to the negative line 39.

The voltage output of the emitter-follower transistor 62 is further filtered by the condenser 64 and applied to the base 65b of the PNP emitter-follower transistor 65. The emitter 62e of the emitter-follower transistor 62 is coupled to the base 65b of the PNP emitter-follower transistor 65 by a diode 66. The condenser 64 is connected in common to the diode 66 and the base 65b. A resistor 67 is connected in common to the diode 66 and the emitter 62e and to the negative line 39 in common with the condensers 61 and 64. The negative side of the condenser 64 is connected in common to the negative line 39 and the collector 65c, while the emitter 65e is connected to the positive line 38 through a resistor 68. The output line 69 of the emitter-follower 65 and the frequency to voltage converter transmits the voltage level signal to the input line 70 of the differential amplifier 18. The output line 69 is taken off between the emitter 65e of the emitter-follower 65 and the resistor 68. The lower the voltage on the base 65b of the emitter follower 65, the more the emitter-follower will conduct, and, therefore, the lower the voltage on the emitter 65e, thereby maintaining the same voltage as its base. This voltage is applied to a base of the differential amplifier for comparison with the reference voltage set through the reference voltage device 20 by the engineer.

This reference voltage device includes a potentiometer 71 having its resistance winding connected across the positive and neagtive lines 38 and 39 of the frequency to voltage converter through resistors 72 and 73, while its pick-off is connected through line 74 to a base input line 75 of the differential amplifier. The pickoff is also connected through line 74 and a condenser 76 to the negative line 39. The reference voltage control 20, operable by the engineer, allows a varying reference voltage to be set within the limits of the speed range selector switch. Thus, a speed voltage signal is applied to the differential amplifier through the speed voltage line 70, while a selected speed reference voltage is applied to the differential amplifier through the reference voltage line 75.

DIFFERENTIAL AMPLIFIER AND PULSE GENERATOR

The differential amplifier is driven by a pulsating supply voltage generated by the pulse generator 21, in place of the conventional steady state DC supply voltage. This method of driving a differential amplifier prevents the train from overshooting the speed for which it was set. It results in imparting spurts of power to the locomotive wheels, thereby providing a smooth non-slipping start with a gradual buildup of speed and minimum overshoot as the system builds up to the speed setting. The pulsing output of the differential amplifier decreases in amplitude as the averager 25 gradually builds up a steady DC value of supply to the differential amplifier.

The pulse generator is driven by 115 v. DC supplied from the power supply 26. This voltage is reduced by the resistor 77 and applied across the positive and negative lines 78 and 79. A condenser 80 is connected across the input end of the positive and negative lines. The pulsating voltage delivered to the differential amplifier is generated by utilizing the increasing voltage of an RC time constant of resistor 81 and condenser 82 to fire the unilateral switch 83. The resistor 81 and the condenser 82 are connected in common to the anode 83a of the unilateral switch 83, and respectively to the positive and negative line 78 and 79. A resistor 84 is connected to the gate 83g of the unilateral switch and to the positive line 78, while the cathode 83c of the unilateral switch is connected in common to resistors 85 and 86. Resistor 86 is connected to the negative line 79. The anode voltage of the unilateral switch 83 increases at the RC rate until the breakover voltage across the unilateral switch is exceeded. At this point, the unilateral switch fires and discharges condenser 82, the result being a saw-toothed voltage, with a period approximately one second on the anode 83a. The cathode 83c displays a positive-going spike voltage with the same period.

The voltage from the cathode 38c of the unilateral switch 83 is applied to the inverting transistor 87, and in particular to the base 87b through the resistor 85. The inverting transistor 87 inverts and shapes the voltage of the unilateral switch 83 into a negative-going, rectangular pulse, which is displayed across the resistor 88 that is connected in common to the collector 87c of the inverter transistor 87 and the base 89b of a second inverting transistor 89. The emitters 87e and 89e of the transistors 87 and 89 are connected in common and to the negative line 79. The collector 89c of the transistor 89 is connected to the positive line 78 through a resistor 90.

The inverting transistor 89 again inverts the voltage and amplifies same before feeding it into the Darlington circuit arrangement of transistors 91 and 92. The base 91b of the transistor 91 is connected to the collector 89c of the inverting transistor 89.

In the Darlington circuit arrangement the collectors 91c and 92c of the transistors 91 and 92 are connected in common, while the emitter 91e of the transistor 91 is connected directly to the base 92b of the second stage transistor 92. The collectors are also connected to the positive line 78. A diode 93 is connected across the base 91b of transistor 91 and the emitter 92e of the transistor 92, and a resistor 94 is connected in common to the diode 93 and emitter 92e, and to the negative line 79.

The influence of condenser 95 and Zener diode 96 causes the waveform output of the Darlington circuit arrangement appearing at the base 97b of the emitter-follower 97, through the potentiometer 98 to become an inverted saw-tooth voltage. This inverted saw-tooth voltage is applied by the emitter-follower 97 as the supply voltage to the differential amplifier transistors 99 and 100.

The common between the condenser 95 and the Zener diode 96 is coupled to the emitter 92e of the second stage transistor 92 through a diode 101. The resistance winding of the potentiometer 98 is connected between the Zener diode 96 and a resistor 102, the latter of which is connected to the negative line 79, while the pickoff of the potentiometer is connected directly to the base 97b of the emitter-follower 97. The collector 97c of the emitter-follower 97 is connected to the positive line 78, while the emitter 97e is connected through a resistor 103 to the collector 99c of differential amplifier transistor 99. Accordingly, a pulsating inverted saw-tooth voltage is generated by the pulse generator and fed into the differential amplifier as its supply voltage.

For purposes of setting forth the circuitry of the differential amplifier, the negative supply line will constitute the same line 79 as for the pulse generator, while the positive supply line will be designated as 104. The pulsating voltage supply from the pulse generator is applied across the collectors 99c and 100c through the resistor 103 and the resistor 105, and the emitters 99e and 100e through a resistor 106 and a potentiometer 107. The resistance winding of the potentiometer 107 is connected across the emitters 99e and 100e, while the pickoff is connected to the resistor 106. Imbalance due to differences in transistor or circuit characteristics of the differential amplifier may be adjusted by the potentiometer 107. The speed voltage signal level from the frequency to voltage converter is applied to the base 99b of the differential amplifier transistor 99, while the reference voltage signal is applied to the base 100b of the differential amplifier transistor 100. Thus, the speed of the locomotive is introduced into transistor 99, while the selected speed is introduced into the transistor 100, the latter being obtained by the setting of the potentiometer 71. The collector 100c of the differential amplifier transistor 100 connects through line 108 to the emitter-follower 24 of the averager and emitter-follower module 22, while the collector 99c of the transistor 99 connects to the averager 25 through line 109. The averager supplies a DC voltage to the collector 99c, which acts in series with the pulsating voltage supplied by the pulse generator 21.

A condenser 110 is connected across the collectors 99c and 100c of the differential amplifier transistors, while one side is also connected to the emitter-follower output line 108. A condenser 111 connects between the common of the reference voltage input line 75 and the base 100b of the transistor 100, and the emitter-follower output line 108. The base 100b is also connected in common with resistors 112 and 113 that are connected across the pulsating voltage input to the differential amplifier.

AVERAGE AND EMITTER-FOLLOWER

The emitter-follower 24 receives its input from the differential amplifier through the plugging relay 114 along line 115 leading to the relay and line 116 leading into the emitter-follower. The output of the emitter-follower is connected through output lines 117 and 118 to the generator field of the locomotive and in the form of an analog control voltage. The averager 25 has as its input a portion of the emitter-follower output, and produces an output through line 119 leading to the plugging relay, and line 120, to the differential amplifier in the form of a gradually changing DC voltage level, thereby preventing fast changes in the control voltage output of the emitter-follower 24.

Both the emitter-follower 24 and the averager 25 are driven by the 74 v. DC train voltage that is introduced across positive and negative lines 121 and 122. Similarly, the train voltage drives the power supply 26.

The emitter-follower of the averager and emitter-follower 22 include transistors 123, 124 and 125 connected in a standard Darlington configuration, wherein the collectors 123c 124c and 125c are connected in common, the emitter 123e is connected to the base 124b, and the emitter 124e is connected to the base 125b. The output of the differential amplifier constituting the difference in the voltages of the speed signal and the reference signal, is fed into the emitter-follower 24 and connected through line 116 to the base 123b of the first transistor 123. The output of the emitter-follower is taken from the emitter 125e of the third stage transistor 125 and fed through a diode 126 to the output line 117. The output is taken from lines 117 and 118 off the resistor 127 connected therebetween.

A voltage divider consisting of serially connected resistors 128 and 129 that are connected between the collectors of the emitter-follower transistors 123, 124 and 125, and the emitter 125e of the third stage transistor 125 permit a portion of the output of the emitter-follower to be delivered through lines 130 and 131 to the input side of the averager 25. A resistor 132 is connected in common with the resistor 128 and the collectors of the emitter-follower transistors, and to the output line 131, while a resistor 133 is connected in common to the resistors 128 and 129, and to the output line 130. A resistor 134 is connected in common to the negative side of the train voltage and the resistor 127, and in common with the emitter 125e of the third stage transistor 125, the diode 126 and the resistor 129. The positive side of the train voltage is connected in common to the collectors of the transistors 123, 124 and 125, and the resistors 128 and 132.

The line 131 is connected to the potentiometer 135 and the pickoff of the potentiometer, through a diode 136, and to the base 137b of the first stage transistor 137 that is connected in Darlington configuration with transistors 138, 139 and 140. The resistance winding of the potentiometer 135 is connected between the line 131 and the negative line 122 of the train voltage. Output line 130 of the emitter-follower is connected to the pickoff of potentiometer 141, which has its resistance winding connected only on one side to the input side of the averager and the base 137b of the first stage transistor 137.

The averager is a very high impedance, four stage, Darlington circuit including the transistors 137, 138, 139 and 140, the high impedance being necessary to present a high impedance discharge path to the condenser 142. When greater train speed is required from the system, the condenser 142 is "pumped" up to successively higher voltages by each pulse from the differential amplifier 18 through the emitter-follower 24. This "pumping" action continues until the differential amplifier reaches a state of equilibrium as determined by the actual train speed equalling the preselected or set speed as represented by the reference voltage device 20. If less train speed is required, the condenser 142 is gradually discharged by negative-going pulses originating at the differential amplifier 18. In either case, a DC level with pulses superimposed results as the output of the emitter-follower 24. It can then be appreciated that when train speed is below the setting, the composite signal is mostly pulsed in character and then the DC level gradually increases in magnitude as pulse height diminishes.

The positive train line voltage is delivered into the averager along line 143, through resistor 144 and to the collectors 137c, 138c, 139c and 140c of the four stage Darlington circuit transistors. As is customary in a Darlington configuration, the collectors are connected in common, while the emitter 137e of the first stage transistor is connected to the base 138b of the second stage transistor, the emitter 138e of the second stage transistor is connected to the base 139b of the third stage transistor, and the emitter 139e of the third stage transistor is connected to the base 140b of the fourth stage transistor. The output of the averager is taken from the emitter 140e of the fourth stage transistor along output line 145, line 119, through the plugging relay 114, and the input line 120 to the differential amplifier. It should be appreciated that the connections between the differential amplifier, and the averager and emitter-follower have been set forth in the usual form where the plugging relay is not energized to effect plugging, but set to allow normal speed control operation.

A resistor 146 connects the common of the emitter 138e and the base 139b with the negative side of the train voltage. Similarly, a resistor 147 connects the common of the emitter 139e and base 140b with the negative side of the train voltage. Resistor 148 connects the common of the emitter 140e and the output line 145 with the negative side of the train voltage, while a condenser 149 connects in common with the resistor 148, the emitter 140e and the output line 145, and the negative side of the train voltage. Condenser 150 connects to the negative side of the train voltage and the common of the resistor 144 and the collectors of the averager transistors 137, 138, 139 and 140.

POWER SUPPLY

The power supply 26 is a standard DC voltage to DC voltage converter having as its input the nominal 74 v. DC train supply, and as its output two separate 115 v. DC voltages, one of which constitutes the supply voltage for the pulse generator and differential amplifier module 19 and the other of which provides a supply voltage for the frequency to voltage converter 17. These 115 v. DC supply voltages have no common connection, in that they are generated from separate windings 151 and 152 on the transformer 153, and respectively rectified by separate, full-wave bridges 154 and 155.

The input to the transformer 153 is received from an inverter through a winding 156, and a winding 157 center tapped at 158. The winding 156 is connected to a winding 159 of a transformer 160, which transformer couples the transformer 153 to inverter transistors 161 and 162. Winding 163 of the transformer 160 is connected through resistors 164 and 165 to the bases 161b and 162b of the inverter transistors. The collectors 161c and 162c of the inverter transistors are connected to opposite ends of the winding 157 of transformer 153, while the emitters 161e and 162e are connected in common. Center tap 158 of the winding 157 is connected in common to the positive side of the train voltage, a resistor 166 and a condenser 167. Resistor 166 is connected in common to a tap 168 on the winding 163 of the transformer 160, and a diode 169. The diode 169 is also connected to the emitters of the inverter transistors. A condenser 170 is connected across the diode 169. It can also be seen that the emitters of the inverter transistors are connected to the negative side of the train supply voltage. A condenser 171 is connected between the negative terminal of the full-wave bridge 155 and the negative side of the train voltage supply. Thus, it can be appreciated that the power supply 26 inverts the train supply voltage to an AC voltage, steps the voltage up and then rectifies the AC voltage to provide the proper DC voltage.

In the event, during an automatic loading operation, the train is moving downgrade with a tendency to pick up speed as the weight of the train increases, the speed control device can be employed to automatically handle slowing down by plugging. In this case, the plugging relay 114 is energized to reverse the connections to the differention amplifier 18, so as to provide an increasing current to the generator field and effect slowdown. In the usual operation, when the plugging relay is not energized, the speed control device increases the current to the generator field to bring the train up to speed. Accordingly, the speed control device of the invention is useful in regulating train speed operation and in plugging operations.

It will be understood that modifications and variations may be effected without departing from the scope of the novel concepts of the present invention.

The invention is hereby claimed as follows:

1. In a speed control device for a locomotive having a generator controlling operation of traction motors, and means producing a speed signal in pulse waveform representing the locomotive speed, said speed control device including means for converting the pulse waveform speed signal to a speed voltage level, adjustable means actuatable by the locomotive operator for producing a reference voltage according to a selected locomotive speed, a differential amplifier receiving said speed voltage level and said reference voltage for comparison, means producing a pulsating supply voltage for said differential amplifier, an emitter follower for receiving the output from the differential amplifier, means connecting the output of the emitter-follower to the field of the generator, and an averager receiving a portion of the output of the emitter-follower and delivering a gradually changing DC level to the differential amplifier to prevent fast changes in the output of the emitter-follower.

2. In a speed control device as defined in claim 1, and means for reversing the output of the differential amplifier and the input thereto of the averager to effect plugging of the traction motors.

3. In a speed control device as defined in claim 1, wherein said pulse waveform converting means includes speed range selector switch means for selecting one of a plurality of speed ranges.

4. In a speed control device as defined in claim 3, and said reference voltage producing means including a potentiometer for regulating the set speed within one of the speed ranges.

5. In a speed control device as defined in claim 1, and means in said differential amplifier for adjusting imbalance due to differences in circuit characteristics.

6. In a speed control device as defined in claim 1, wherein said pulse waveform converting means consists of a frequency to voltage converter.

7. In a low speed control device for a train adapted to automatically control the speed thereof, wherein the locomotive is provided with a generator operating traction motors and means producing a speed signal in rectangular pulse waveform, the repetition of which is proportional to train speed, said low speed control device including a speed range switch for selecting a speed range of operation, a switch means selecting the speed within a set speed range, a frequency to voltage converter for converting the rectangular pulse waveform speed signal to a speed voltage level, said switch means producing a reference voltage according to a selected locomotive speed within a selected speed range, a differential amplifier receiving said speed voltage output from the frequency to voltage converter and the reference voltage output from said switch means for comparison, a pulse generator producing a pulsating voltage supply for said differential amplifier, an emitter-follower for receiving the output from the differential amplifier and feeding same to the field of the generator, and an averager receiving a portion of the emitter-follower output and feeding a gradually changing DC level voltage back to the differential amplifier.

8. In a low speed control device as defined in claim 7, and means for producing a steady state DC voltage supply and feeding same to the frequency to voltage converter.

9. In a low speed control device as defined in claim 8, and means for producing a steady state DC voltage supply and feeding it to the pulse generator.

10. In a low speed control device as defined in claim 7, and means for reversing the output of the differential amplifier and the input thereto of the averager to effect plugging of the traction motors.

11. In a low speed control device as defined in claim 7, wherein said frequency to voltage converter includes a speed range selector switch means for selecting one of a plurality of speed ranges.

12. In a low speed control device as defined in claim 11, wherein said switch means includes a potentiometer for regulating the set speed within one of the speed ranges.

References Cited

UNITED STATES PATENTS

| | | | |
|---|---|---|---|
| 3,170,104 | 2/1965 | Richards et al. | 318—146 |
| 3,242,407 | 3/1966 | Hansen | 318—143 |

ORIS L. RADER, Primary Examiner

T. LANGER, Assistant Examiner

U.S. Cl. X.R.

318—310, 327